(12) United States Patent
Hiernaux

(10) Patent No.: US 10,273,977 B2
(45) Date of Patent: Apr. 30, 2019

(54) PERFORATED DRUM OF A COMPRESSOR OF AN AXIAL TURBINE ENGINE

(71) Applicant: Techspace Aero S.A., Herstal (Milmort) (BE)

(72) Inventor: Stéphane Hiernaux, Heers (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 344 days.

(21) Appl. No.: 15/198,927

(22) Filed: Jun. 30, 2016

(65) Prior Publication Data

US 2017/0023023 A1   Jan. 26, 2017

(30) Foreign Application Priority Data

Jul. 1, 2015  (BE) .................................. 2015/5416

(51) Int. Cl.
*F01D 11/00* (2006.01)
*F01D 11/04* (2006.01)
(Continued)

(52) U.S. Cl.
CPC ............. *F04D 29/682* (2013.01); *F01D 5/06* (2013.01); *F01D 11/001* (2013.01); *F01D 11/04* (2013.01);
(Continued)

(58) Field of Classification Search
CPC ........ F01D 11/00; F01D 11/001; F01D 11/02; F01D 5/06; F01D 11/04; F04D 29/682; F04D 27/009; F04D 29/083; F04D 29/164; F04D 29/321; F04D 29/522; F04D 29/542; F02C 6/08; F05D 2260/6022; Y02T 50/672
(Continued)

(56) References Cited

U.S. PATENT DOCUMENTS 3,528,241 A * 9/1970 Gill, Jr. ..................... F02C 7/06
                                                       60/39.08
3,572,960 A * 3/1971 McBride .................. F01D 5/14
                                                        415/115
(Continued)

FOREIGN PATENT DOCUMENTS

EP    1643136 A1    4/2006
EP    2305960 A1    4/2011
(Continued)

OTHER PUBLICATIONS

Search Report dated Mar. 9, 2016 for BE 201505416.

*Primary Examiner* — Richard A Edgar
(74) *Attorney, Agent, or Firm* — James E. Walton

(57) ABSTRACT

A rotor, in particular a drum of a low-pressure compressor of a turbojet aero engine, is disclosed. The rotor includes an outer annular wall delimiting a primary annular flow of the turbine engine, sealing devices with two rubbing strips or annular ribs formed on the wall. The rubbing strips cooperate by abrasion with inner shrouds. In addition, the annular wall includes rows of intake orifices for leakages which are arranged between each pair of rubbing strips in order to aspirate the recirculation leakages there. A plenum for leakages is formed inside the rotor by means of a composite partitioning, then evacuates the parasitic flow downstream of the turbine engine via the central shaft.

8 Claims, 3 Drawing Sheets

(51) Int. Cl.
*F04D 27/00* (2006.01)
*F04D 29/08* (2006.01)
*F04D 29/16* (2006.01)
*F04D 29/32* (2006.01)
*F04D 29/52* (2006.01)
*F04D 29/54* (2006.01)
*F04D 29/68* (2006.01)
*F01D 5/06* (2006.01)
*F02C 6/08* (2006.01)

(52) U.S. Cl.
CPC .............. *F02C 6/08* (2013.01); *F04D 27/009* (2013.01); *F04D 29/083* (2013.01); *F04D 29/164* (2013.01); *F04D 29/321* (2013.01); *F04D 29/522* (2013.01); *F04D 29/542* (2013.01); *F05D 2260/6022* (2013.01); *Y02T 50/672* (2013.01)

(58) Field of Classification Search
USPC ................ 415/168.2, 168.4, 173.7, 174.5
See application file for complete search history.

(56) References Cited

U.S. PATENT DOCUMENTS

| | | | |
|---|---|---|---|
| 4,719,747 A | 1/1988 | Willkop et al. | |
| 4,795,307 A | 1/1989 | Liebl | |
| 5,236,302 A | 8/1993 | Weisgerber et al. | |
| 7,581,920 B2* | 9/2009 | Lardellier | F01D 5/145 415/1 |
| 8,753,074 B2* | 6/2014 | Vallino | F01D 11/122 415/144 |
| 2011/0033303 A1* | 2/2011 | Pegouet | F02C 6/08 416/223 A |
| 2018/0128173 A1* | 5/2018 | Lemarchand | F02C 7/00 |

FOREIGN PATENT DOCUMENTS

| | | |
|---|---|---|
| EP | 2378070 A2 | 10/2011 |
| FR | 2892148 A1 | 4/2007 |
| FR | 2930589 A1 | 10/2009 |

* cited by examiner

PERFORATED DRUM OF A COMPRESSOR OF AN AXIAL TURBINE ENGINE

This application claims priority under 35 U.S.C. § 119 to Belgium Patent Application No. 2015/5416, filed 1 Jul. 2015, titled "Perforated Drum of a Compressor of an Axial Turbine Engine," which is incorporated herein by reference for all purposes.

BACKGROUND

1. Field of the Application

The present application relates to recirculation leakages at a bladed rotor of an axial turbine engine. The present application also concerns a compressor of an axial turbine engine. The present application also proposes an axial turbine engine such as a turbojet aero engine.

2. Description of Related Art

A compressor, like a turbine of a turbojet aero engine, has a series of rows of vanes. Some of these rows are linked to the stator and others linked to the rotor. The definition of the profile of the vanes allows the processing of annular flows, by causing them to be compressed or expanded to recover energy. The efficiency of these mechanical actions on the flow depends on management of parasitic discharges.

In fact, on operation of the turbine engine, leakages pass around the rows of stator vanes. They can circulate between the rotor and the inner shroud. These recirculations cause losses by mixing. They are reflected in a reduction of the flow which is effectively compressed, and in an increase of the flow upstream of the stator vane row concerned.

The increase may have the effect of blocking or limiting the flow which can be utilised by said vane row. Re-injection of the recirculations—or parasitic leakages—degrades the flow at the feet of the stator vanes. The stability of the compressor deviates from an acceptable level. The thermodynamic behaviour is also affected, in particular due to the creation of entropy.

In order to avoid or at least limit the effects of these recirculations, it is known to provide orifices to recover the recirculations. The recirculations are then intercepted and evacuated via the orifices. They leave the primary flow which can no longer be disturbed. Operation is then preserved.

Document EP1643136A1 discloses a compressor of an axial turbine engine. The compressor has several rows of fixed vanes, the inner ends of which carry the inner shrouds. The shrouds cooperate with rubbing strips and have extraction orifices arranged between the rubbing strips. The vanes comprise inner cavities which form communication channels between the extraction orifices and an external plenum. The operating pressure of the plenum is lower than that of the extraction orifices. Therefore a parasitic discharge circulating below the inner shroud can be aspirated via the extraction orifices then evacuated via a plenum. This solution adds thickness to the vanes for housing a cavity therein. The vanes of a low-pressure compressor are generally fine, and consequently this solution is not satisfactory. In addition, this configuration generates an additional cost for housing the cavities.

Although great strides have been made in the area of compressors for axial turbine engines, many shortcomings remain.

DETAILED DESCRIPTION OF THE PREFERRED EMBODIMENT

Figure 1:
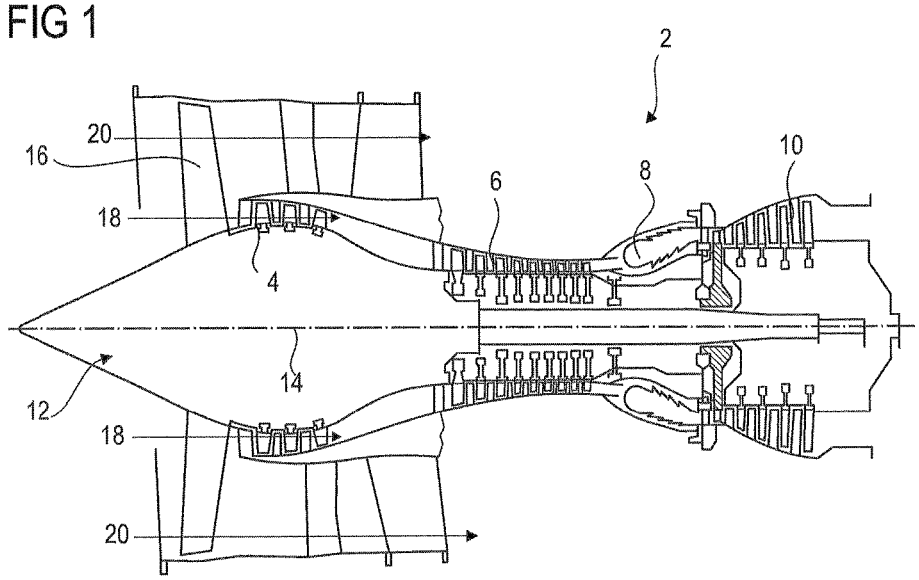
FIG. 1 shows an axial turbine engine according to the present application.

The present application aims to solve at least one of the problems posed by the prior art. More precisely, the object of the present application is to simplify management of the recirculations in an axial turbine engine. The object of the present application is also to increase the capacity for intercepting recirculations.

The object of the present application is a rotor of an axial turbine engine, in particular a drum of a compressor of an axial turbine engine, the rotor comprising: an annular outer wall delimiting a primary annular flow of the turbine engine, a sealing device formed on the wall, distinguished in that the annular wall comprises at least one intake orifice for leakages arranged at the axial level of the sealing device to divert the leakages therefrom so as to evacuate them axially beyond the rotor.

According to an advantageous embodiment of the present application, the wall surrounds a cylindrical or annular space which communicates with the intake orifice(s).

According to an advantageous embodiment of the present application, the rotor comprises at least one annular row of rotor vanes which is carried by the annular wall and arranged upstream of at least one orifice and/or the sealing device.

According to an advantageous embodiment of the present application, the wall comprises several orifices forming at least one annular row, preferably several annular rows, the orifices being in some cases distributed angularly around the wall.

According to an advantageous embodiment of the present application, the rotor comprises dynamic balancing elements to compensate for the presence of the orifice(s).

According to an advantageous embodiment of the present application, the annular wall comprises escape openings directed upstream, which may communicate with escape piercings of a disc of the fan.

According to an advantageous embodiment of the present application, the wall comprises a revolution profile with a portion extending principally axially and/or a portion extending principally radially, for example to form a fixing flange for the fan disc and/or for fixing to a central shaft, at least one or each orifice being arranged at the level of the axial portion.

According to an advantageous embodiment of the present application, the device comprises at least one radial annular rib, in particular with an outer circular tip.

According to an advantageous embodiment of the present application, the device comprises at least one set of radial annular ribs intended to cooperate with an inner shroud, the orifice being arranged axially between said annular ribs, each intake orifice of the outer wall preferably being arranged axially between annular ribs belonging to a same set.

According to an advantageous embodiment of the present application, at least one or each intake orifice comprises a load loss element through said orifice, the element preferably being an insert.

According to an advantageous embodiment of the present application, the rotor comprises an intake plenum for leakages communicating with at least one or each or several intake orifices, the intake plenum preferably being annular.

According to an advantageous embodiment of the present application, the rotor comprises at least one or several annular partitionings inside the wall, the annular web(s) forming at least one or several annular intake plenums for leakages communicating with one or several intake orifices.

According to an advantageous embodiment of the present application, at least one or each orifice is an orifice passing through the wall in order to aspirate a leakage from the outside of the rotor towards the inside of the rotor, and/or the leakage is evacuated via the interior of the rotor.

According to an advantageous embodiment of the present application, the rotor comprises a central shaft, preferably a central shaft with a passage communicating with the orifice(s), wherein the wall may be fixed to said shaft.

According to an advantageous embodiment of the present application, the rotor comprises several annular rows of rotor vanes, the wall having a continuity of material between said rows.

According to an advantageous embodiment of the present application, the rotor comprises a support disc for the vanes of the fan, wherein said disc is arranged upstream of the annular wall and may have escape piercings.

According to an advantageous embodiment of the present application, the rotor comprises an annular row of rotor vanes and/or an annular zone for receiving rotor vanes, arranged upstream and/or at a distance from at least one or each orifice.

According to an advantageous embodiment of the present application, the rotor comprises at least two annular zones for receiving rotor vanes and/or two annular rows of rotor vanes, at least one or each orifice being arranged between two successive annular zones for receiving rotor vanes and/or between two successive annular rows of rotor vanes respectively.

According to an advantageous embodiment of the present application, at least one or each partitioning is made of a composite material with organic matrix.

According to an advantageous embodiment of the present application, the partitioning generally closely follows the inner surface of the rotor wall and/or extends axially over the majority of the wall or the rotor.

According to an advantageous embodiment of the present application, at least one or each partitioning forms a tightly sealing flange.

According to an advantageous embodiment of the present application, the rotor comprises several leakage intake plenums, each communicating with an annular row of intake orifices.

According to an advantageous embodiment of the present application, the rotor comprises several intake orifices axially spaced and comprising load loss elements, the load loss of the elements being greater for the downstream elements than for the upstream elements.

According to an advantageous embodiment of the present application, at least one set of ribs comprises two upstream ribs and one downstream rib, at least one orifice or a row of orifices being placed axially between the upstream ribs and the downstream rib of a set.

The present application also concerns a compressor of an axial turbine engine, in particular a low-pressure compressor, the compressor comprising a rotor, distinguished in that the rotor is in accordance with the present application; the compressor comprises an annular row of stator vanes surrounding the wall at the level of at least one intake orifice or a row of orifices.

According to an advantageous embodiment of the present application, the wall comprises at least one intake orifice for leakages, in particular for leakages by recirculation, at the axial level of stator vanes, for example to evacuate the leakage outside the compressor.

According to an advantageous embodiment of the present application, the stator vanes of the row each comprise a leading edge and a trailing edge, the or each orifice being arranged between the leading edge and trailing edge of the same stator vane, preferably between the inner ends of the leading edge and the trailing edge of the same stator vane.

According to an advantageous embodiment of the present application, the compressor comprises an inner shroud connected to the inner ends of the stator vanes, the or each or some intake orifices being arranged axially at the level of the inner shroud.

According to an advantageous embodiment of the present application, the inner shroud comprises an annular layer of abradable material intended to cooperate by abrasion with annular ribs of the rotor in order to ensure a dynamic seal.

The present application also concerns a compressor for a turbine engine, in particular a low-pressure compressor for an axial turbine engine, the compressor comprising a rotor with an annular wall, in particular to support one or more annular rows of rotor vanes by means of an annular platform or annular retaining groove; an annular row of stator vanes surrounding the annular wall; distinguished in that the wall comprises at least one intake orifice for leakages, in particular by recirculation, at the axial level of the stator vanes, for example to evacuate the leakage outside the compressor, where applicable via the interior of the rotor.

The present application also concerns a turbine engine, comprising a rotor and/or a compressor, distinguished in that the rotor is in accordance with the present application, and/or the compressor is in accordance with the present application.

According to an advantageous embodiment of the present application, the turbine engine comprises a hollow shaft with a passage, in particular a central shaft passing axially through the rotor, at least one or several or each intake orifice being in communication with the passage of the hollow shaft.

According to an advantageous embodiment of the present application, the turbine engine comprises a fan with an upstream cone which has an internal cavity, and the passage communicates with the internal cavity of the cone, the turbine engine being preferably configured so as to keep the cone at the ambient pressure of the turbine engine.

According to an advantageous embodiment of the present application, the passage of the hollow shaft opens at and/or communicates with the exterior of the turbine engine, in particular downstream.

In general, the advantageous embodiments of each subject of the present application are also applicable to the other subjects of the present application. The different subjects may be understood as different interpretations of the present application. As far as possible, each subject of the present application may be combined with the other subjects.

The arrangement of the intake orifices on the rotor offers more space. Since there are fewer constraints on the choice of diameter of the orifices, their number may be reduced. Fewer zones are affected. The cost of the corresponding rotor is then reduced. Savings are also achieved since simple piercings on the rotor have an effect. The effect on the forms and the methods of production of the other components of the turbine engine is limited or zero. The integration of the insert is also simplified.

Evacuation outside the rotor simplifies its operation and hence its design. Evacuation of leakages or secondary discharges towards the downstream side of the rotor does not disturb the flow in the turbine engine. The boundary layers are no longer adversely affected and adhere better to their wall. Maintenance is simplified since a single orifice through the wall is sufficient to manage the extraction. The break-up of the abradable layer is less disruptive since the orifices have a simple geometry. There is less risk of their becoming blocked, and less risk of blockage of the leakage escape circuit.

In the description below, the terms interior or inner, and exterior or outer, relate to a positioning relative to the axis of rotation of an axial turbine engine. The axial direction corresponds to the direction along the axis of rotation of the turbine engine. Upstream and downstream refer to the main flow direction of the flow in the turbine engine.

FIG. 1 shows in a simplified fashion an axial turbine engine. In this precise case, this is a ducted fan turbine engine for powering an aircraft. The turbojet engine 2 comprises a first compression level called the low-pressure compressor 4, a second compression level called the high-pressure compressor 6, a combustion chamber 8 and one or more levels of turbines 10. In operation, the mechanical power of the turbine 10 transmitted via the central shaft to the rotor 12 sets the two compressors 4 and 6 in motion. The latter comprise several rows of rotor vanes associated with rows of stator vanes. Rotation of the rotor around its rotation axis 14 thus allows generation of an air flow and its progressive compression up to the inlet of the combustion chamber 8. Demultiplication means may increase the rotation speed transmitted to the compressors.

An inlet fan, generally called a fan or blower 16, is coupled to the rotor 12 and generates an air flow which is divided into a primary flow 18 passing through the various above-mentioned levels of the turbine engine, and a secondary flow 20 passing through an annular duct (partially shown) along the machine to rejoin the primary flow at the outlet from the turbine. The secondary flow may be accelerated so as to generate a thrust reaction. The primary flow 18 and secondary flow 20 are annular flows, and are ducted via the casing of the turbine engine. To this end, the casing has cylindrical walls or shrouds which may be internal and external.

Figure 2:
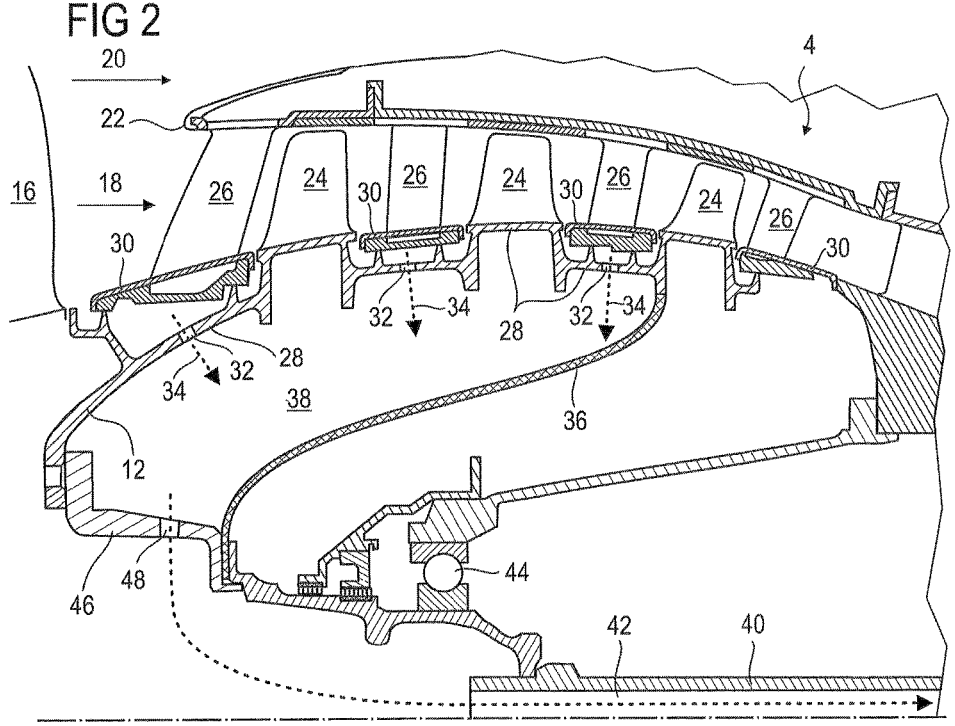
FIG. 2 is a diagram of a compressor of a turbine engine according to a first embodiment of the present application.

FIG. 2 is a cross-section view of a compressor of an axial turbine engine as shown in FIG. 1. The compressor may be a low-pressure compressor 4. The separating tip 22 of the primary flow 18 and secondary flow 20 can be seen. The rotor 12 is generally hollow and forms a drum. It comprises several rows of rotor vanes 24, in this case three. The vanes 24 may be welded to the outer annular wall 28 of the rotor 12, for example by orbital welding. Alternatively, they may be received in annular retention grooves.

The compressor 4 comprises several diffusers, in this case four, each of which contains a row of stator vanes 26. These vanes 26 extend substantially radially. The diffusers are associated with the fan 16 or with a row of rotor vanes 24 and diffuse the primary air flow 18 so as to convert the speed of the flow into static pressure.

Inner shrouds 30 may be connected to the stator vanes, surrounding the rotor 12. They surround sets of annular ribs of the rotor 12, normally called rubbing strips, which form sealing devices of the rotor 12. Skimming over these, they allow a dynamic seal. In or at the level of at least one or each sealing device, the rotor 12 has an annular row of orifices 32 passing radially through its wall. These orifices 32 may be intake or evacuation orifices 32 for the recirculation leakages 34 between the rotor 12 and the inner shrouds 30.

The rotor 12 may be equipped with an annular partitioning 36 to form an intake plenum 38 for the leakages 34. The plenum 38, or collector, may be an annular or cylindrical space 38. The partitioning 36 separates the leakages 34 from the ventilation circuit. The partitioning 36 may be substantially flexible and retain its shape by centrifugal force. It may be fixed to the rotor 12 and to the central drive shaft 40 of the rotor of the compressor 4, which facilitates evacuation of the leakages 34 through the axial passage 42 through said hollow shaft 40. The shaft 40 concerned may pass axially through the turbine engine and be actuated by the low-pressure turbine. Its passage 42 may have an escape downstream of the turbine engine.

The partitioning 36 may be dimensioned to pass around the bearings 44, the bearing lubricant enclosure covers, the supply and/or drainage conduits of the lubricant enclosures. It generally closely follows the wall 28 of the rotor. The partitioning 36 may extend over the axial majority of the drum. Instead of the partitioning 36, it is possible to equip each intake orifice with an intake pipe.

The rotor 12 of the compressor 4, or at least its portion in the drum, may be fixed to the central shaft 40 of the turbine engine, for example via an adapter 46. This adapter 46 may have an escape opening 48 to allow communication between the plenum 38 and the inner passage 42 of the shaft 40. The adapter 46 may also allow a disc supporting the vanes of the fan 16 to be connected to the central shaft 40 and/or to the compressor 4. The partitioning 36 may be fixed between two adapter portions 46 downstream of the drum. An epicyclic reduction gear may be interposed.

The wall 28 of the rotor 12 of the compressor may have a revolution profile. This profile may be generally curved. It may have a portion extending generally axially and a portion extending principally radially. The axial portion receives the rotor vanes 24 and the intake orifices 32. The radial portion may serve for fixing the drum. It is linked to the shaft 40. It may form an intermediate piece between the shaft 40, or at least its adapter 46, and the disc of the fan 16.

The rotor 12 may comprise dynamic balancing elements. These compensate for the heterogeneities due to the presence of the orifices 32.

Figure 3:
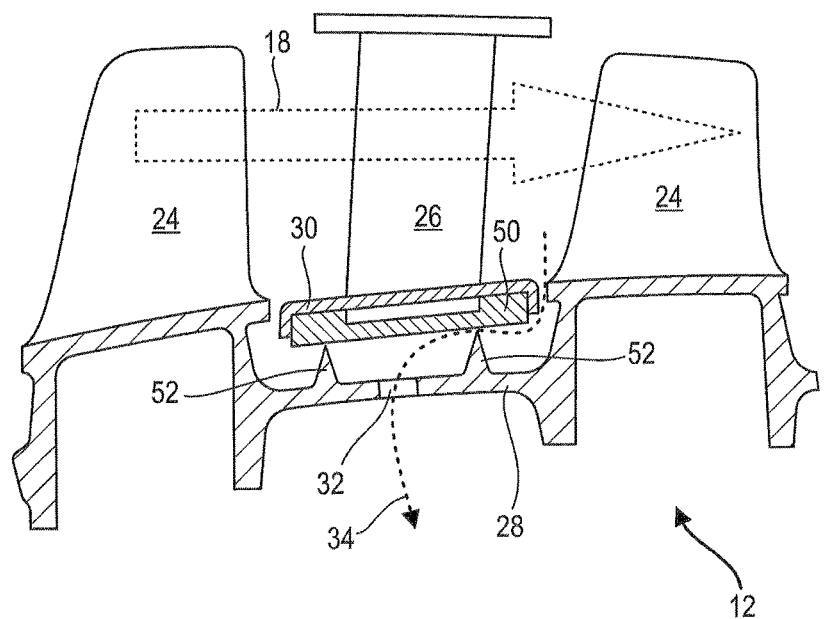
FIG. 3 shows a portion of the compressor of the present application.

FIG. 3 shows a portion of the compressor, for example that shown in FIG. 2. A vane 26 of a stator row is arranged between two vanes 24 of two rows of the rotor 12. The primary flow 18 of the turbine engine passes through this portion.

The stator vane 26 supports the inner shroud 30 at its inner end. By its outer surface, the inner shroud 30 allows the primary flow 18 to be delimited and guided. An annular layer 50 forming a jointing seal 50 is applied to the inside of the shroud. The jointing seal 50 may be a joint ensuring a dynamic seal, in the sense that the tightness improves during rotation of the rotor 12. For example, centrifugal force has the effect of enlarging the diameter of the rotor 12 and hence bringing the annular ribs 52 closer to the jointing seal 50, absorbing the functional annular play. The annular ribs 52 have ends with circular tips to reduce the contact area with the jointing seal.

The annular ribs 52 here form a set of ribs, one upstream and one downstream. An orifice 32 is arranged in the sealing device of the rotor 12. It is placed between the ribs 52 facing the abradable layer 50. The orifice 32 captures a recirculation leakage and forces its evacuation from the primary stream. This phenomenon occurs since the primary flow 18 has a higher pressure inside the rotor 12. In the scenario where a parasitic discharge crosses over the downstream rib 52, it is captured by the orifice 32 via which it is evacuated. It can no longer disturb the primary flow 18.

It is conceivable to add an upstream rib to improve the seal. Then the orifice may be located between the downstream rib and the two upstream ribs, so as to form a double barrier to further promote evacuation via the orifice.

Figure 4:
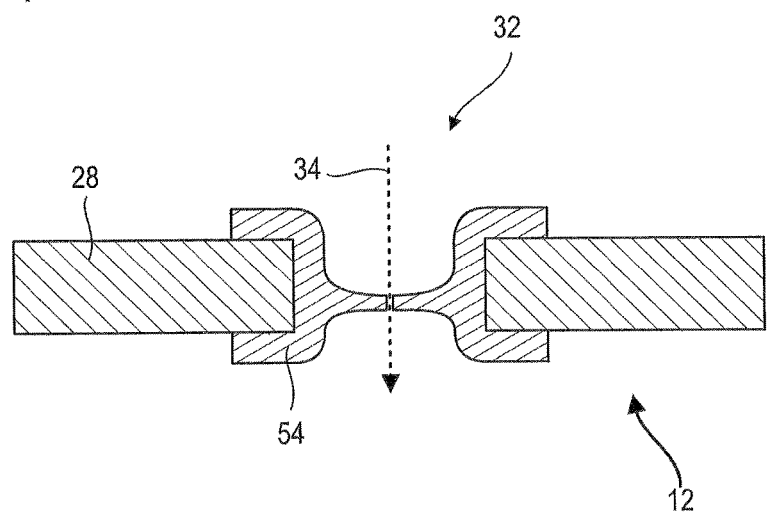
FIG. 4 shows a load loss element.

FIG. 4 shows a load loss element 54 associated with an orifice 32 such as those shown on FIGS. 2 and/or 3. The presence of a load loss element 54 is not essential, for the homogeneity of the aspiration because of the possibility of using dedicated pipes to recover a leakage 34. The load loss element 54 may be such as the inserts shown in document EP2305960A1. It may be adapted to the centrifugal force applicable thereto.

At least one or each element 54 may be housed in an orifice 32, being fixed onto the wall 28. Several intake orifices 32 of the rotor 12 may have calibrated elements 54, which allows control of the flow of the leakage 34 passing through as a function of the difference in local pressure. The elements 54 may have variable load losses. For example, those upstream have a smaller load loss than those downstream. The assembly may be configured such that the extraction of recirculations 32 is balanced homogenously over each stage. This is based on the operating pressure inside the rotor 12 and the nominal pressure at the level of each compression stage. Thanks to the configuration of the elements 54, it is possible to collect the leakages 34 at different pressures using a same plenum in the rotor 12. Despite the communication between the orifices 32 at different pressures, there is no risk that a leakage aspirated downstream will return to the flow at the level of an upstream orifice.

Figure 5:
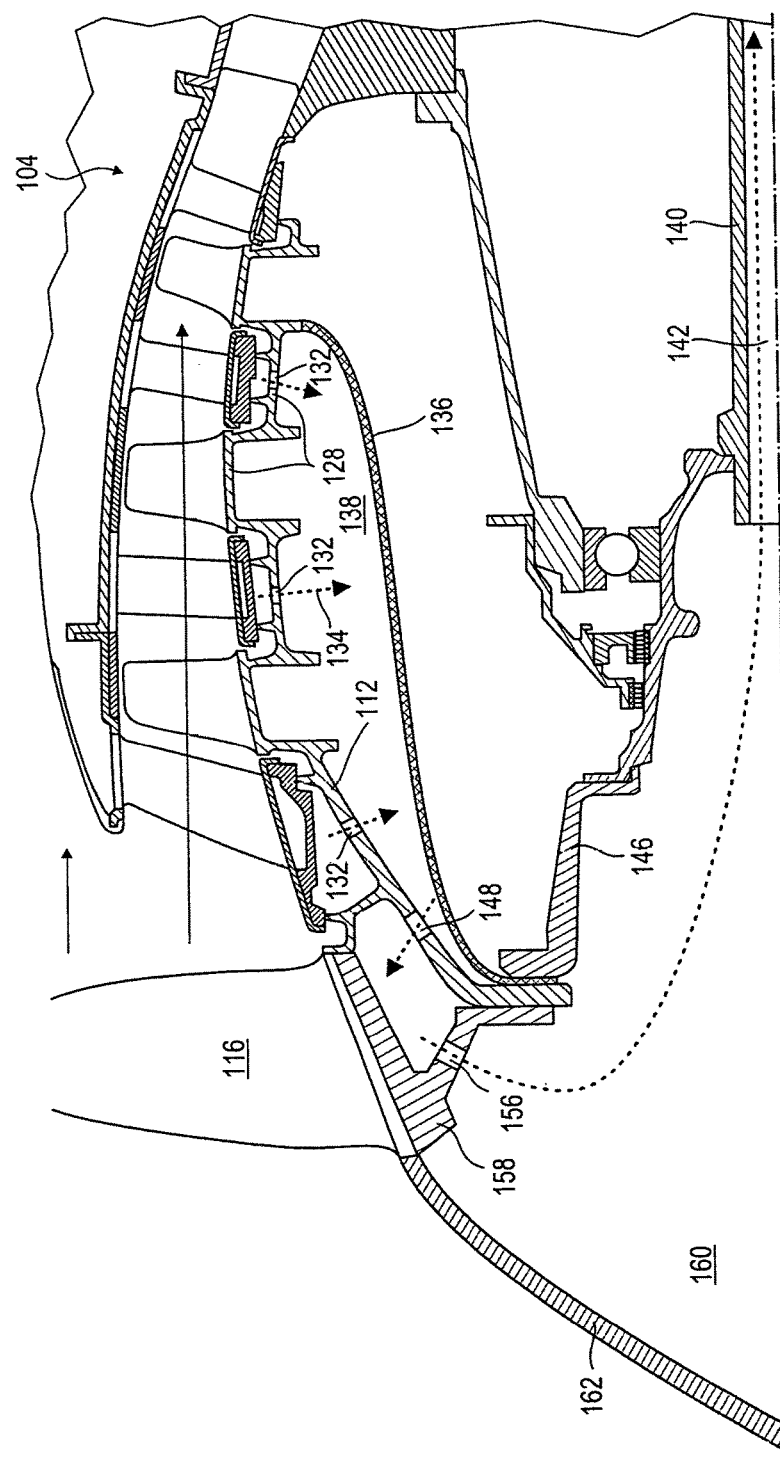
FIG. 5 is a diagram of a compressor of a turbine engine according to a second embodiment of the present application.

FIG. 5 shows a compressor 104 of an axial turbine engine, such as that in FIG. 1, in a second embodiment of the present application. The compressor 104 may have a portion as shown in FIG. 3, and/or one or preferably several load loss elements shown in relation to FIG. 3. FIG. 5 repeats the numbering of the preceding figures for identical or similar elements, wherein the numbering is however incremented by 100. Specific numerals are used for elements specific to this embodiment.

The partitioning 136 is fixed upstream of the rotor 112 of the compressor 104, extending the plenum 138 to the inside of the wall 128 of the rotor 112 of the compressor 104. The partitioning 136 sweeps all intake orifices 132. The output from the plenum 138 is now evacuated upstream thanks to the escape openings 148 directed towards the fan. These escape openings 148 are formed in the wall 128 and communicate with escape piercings 156 formed in the support disc 158 of the fan 116. Via these escape piercings 156, the aspirated leakages 134 are returned to the inside of the fan 116, in particular into the inner cavity 160 of the cone 162 of the fan. They are then evacuated via the passage 142 of the central shaft 140. The adapter 146 may be tightly sealed. It provides a seal between the shaft 140 and the disc 158 of the fan 116.

I claim:

1. A rotor of an axial turbine engine, the rotor comprising: a rotation axis;
an outer annular wall around the rotation axis; and
at least two sealing devices formed on the wall,
wherein the annular wall comprises:
at least two intake orifices for leakages that are axially separated, each intake orifice being disposed within a respective sealing device in order to divert the leakages therefrom and to evacuate the leakages axially beyond the rotor;
wherein the sealing devices each comprise:
at least one set of radial annular ribs configured to cooperate with an inner shroud, the respective orifice being arranged axially between the annular ribs,
wherein the rotor further comprises an intake plenum for leakages communicating with the at least two intake orifices, the intake plenum being at least partly delimited by a partition made of flexible material.

2. The rotor of claim 1, wherein the wall surrounds an annular space which communicates with the at least two intake orifices.

3. The rotor of claim 1, further comprising:
at least one annular row of rotor blades which is carried by the annular wall and arranged upstream of at least one of the at least two orifices and upstream of at least one of the at least two sealing devices.

4. The rotor of claim 1, wherein the wall comprises:
several orifices forming at least one circular row of orifices arranged at a common axial position.

5. The rotor of claim 1, wherein the annular wall comprises:
escape openings directed upstream, which communicate with escape piercings of a fan disc.

6. The rotor of claim 1, wherein the wall comprises:
a revolution profile with a portion extending principally axially and a portion extending principally radially, the at least two orifices being arranged level the axial portion.

7. The rotor of claim 1, wherein at least one or each intake orifice comprises:
a load loss element through the orifice.

8. A turbine engine, comprising:
a fan with a cone which has an internal cavity, the cone being provided with piercings;
a hollow shaft with a passage, wherein the passage communicates with the internal cavity of the cone and with the piercings; and
a rotor, the rotor comprising:
a rotation axis;
an outer annular wall around said rotation axis; and
a sealing device including a set of at least two radial annular ribs formed around the wall;
wherein the annular wall comprises:
at least one intake orifice through the outer annular wall and disposed axially between the at least two radial annular ribs of the set, the at least one intake orifice being in communication with the passage of the hollow shaft through the escape openings arranged in the wall and through the piercings arranged in the cone.

* * * * *